US005698109A

United States Patent [19]

Payne et al.

[11] Patent Number: 5,698,109
[45] Date of Patent: *Dec. 16, 1997

[54] PURIFICATION OF AQUEOUS LIQUOR

[75] Inventors: Geoffrey L. Payne, Suffolk, Va.; Hubert Fairchild, Jr., Oil Springs, Ky.

[73] Assignee: Allied Colloids Limited, England

[*] Notice: The term of this patent shall not extend beyond the expiration date of Pat. No. 5,178,774.

[21] Appl. No.: 603,574

[22] Filed: Feb. 23, 1996

Related U.S. Application Data

[63] Continuation-in-part of Ser. No. 271,118, Jul. 6, 1994, abandoned, which is a continuation-in-part of Ser. No. 989,650, Dec. 14, 1992, abandoned, which is a continuation of Ser. No. 546,435, Jun. 29, 1990, Pat. No. 5,178,774.

[51] Int. Cl.⁶ .................................................. C02F 1/56
[52] U.S. Cl. .......................... 210/727; 209/5; 210/734; 210/735; 210/738; 210/917; 423/122
[58] Field of Search .............................. 209/5; 210/708, 210/723, 725, 727, 728, 732, 734, 735, 738, 917; 423/122

[56] References Cited

U.S. PATENT DOCUMENTS

| Re. 31,900 | 5/1985 | Halverson | 210/734 |
|---|---|---|---|
| 3,021,269 | 2/1962 | Miller | 522/151 |
| 3,147,218 | 9/1964 | Booth et al. | 210/734 |
| 3,235,490 | 2/1966 | Goren | 210/728 |
| 3,836,200 | 9/1974 | Booth | 406/49 |
| 3,860,526 | 1/1975 | Corbett | 252/181 |
| 3,968,037 | 7/1976 | Morgan et al. | 210/47 |
| 3,977,971 | 8/1976 | Quinn et al. | 210/738 |
| 4,089,831 | 5/1978 | Chambers | 524/421 |
| 4,569,768 | 2/1986 | Mckinley | 210/727 |
| 4,578,255 | 3/1986 | Roe et al. | 423/130 |
| 4,698,161 | 10/1987 | Hanson | 210/732 |
| 4,705,640 | 11/1987 | Whittaker | 210/733 |
| 4,720,346 | 1/1988 | Flesher et al. | 210/734 |
| 4,759,856 | 7/1988 | Farrar et al. | 210/734 |
| 4,816,166 | 3/1989 | Cawiezel | 210/727 |
| 4,820,424 | 4/1989 | Field et al. | 210/734 |
| 4,835,206 | 5/1989 | Farrar et al. | 210/728 |

FOREIGN PATENT DOCUMENTS

| 255283 | 2/1988 | European Pat. Off. . |
|---|---|---|
| 326382 | 8/1989 | European Pat. Off. . |
| 2229426 | 2/1973 | Germany . |
| 2341415 | 2/1975 | Germany . |
| 2612101 | 9/1977 | Germany . |
| 2749295 | 5/1978 | Germany . |
| 48-084776 | 11/1973 | Japan . |
| 49-049802 | 5/1974 | Japan . |
| 49-092855 | 9/1974 | Japan . |
| 50-003974 | 1/1975 | Japan . |
| 50-047888 | 4/1975 | Japan . |
| 52-025458 | 2/1977 | Japan . |
| 52-047085 | 4/1977 | Japan . |
| 52-018668 | 5/1977 | Japan . |
| 53-091072 | 10/1978 | Japan . |
| 55-086505 | 6/1980 | Japan . |
| 56-010081 | 3/1981 | Japan . |
| 56-058598 | 5/1981 | Japan . |
| 56-115605 | 8/1981 | Japan . |
| 49-121309 | 4/1983 | Japan . |
| 58-070807 | 4/1983 | Japan . |
| 58-089915 | 5/1983 | Japan . |
| 58-702869 | 5/1983 | Japan . |
| 60-202787 | 10/1985 | Japan . |
| 62-007430 | 1/1987 | Japan . |

OTHER PUBLICATIONS

J.E. Morgan et al., Adv. Chem. Ser.; 187 235–252 (1980), "How Cationic Polymer Structure Relates to Dewatering Efficiency of Waste–Activated Sludges".

Hood et al., Process Technol. Proc., 4 (Flocculation Biotechnol. Sep. Syst.), pp. 773–791, "Dewatering of Red Mud".

*Primary Examiner*—Peter A. Hruskoci
*Attorney, Agent, or Firm*—Ostrolenk, Faber, Gerb & Soffen

[57] ABSTRACT

An aqueous suspension of coagulatable material is coagulated by adding polymeric coagulant to the suspension and then separating the resultant coagulated material from the liquor. The coagulatable material may be present in the aqueous suspension as a suspension of suspended solids or as colloidally dispersed solids. The suspension may be coal tailings or other aqueous (generally mineral) suspension. The polymeric material must be a low molecular weight, highly ionic, polymeric material formed from a diallyl dialkyl ammonium salt. It is added to the aqueous suspension while in the form of polymeric particles having a size mainly above 30 μm and that will dissolve into the suspension and coagulate the coagulatable material. An anionic high molecular weight, flocculant is generally added subsequently in order to flocculate the coagulated material.

27 Claims, No Drawings

PURIFICATION OF AQUEOUS LIQUOR

The application is a continuation in part of application Ser. No. 08/271,118 of 6 Jul. 1994 now abandoned which is a continuation-in-part of Ser. No. 989,650 of 14 Dec. 1992 (abandoned) which is a continuation of application Ser. No. 546435 of 29 Jun. 1990 (now U.S. Pat. No. 5,178,774), both filed by the present inventors.

BACKGROUND OF THE INVENTION

This invention relates to processes of coagulating aqueous suspensions of coagulatable material using water-soluble polymeric coagulants and in particular polymers of diallyl dialkyl ammonium salts such as diallyl dimethyl ammonium chloride (DADMAC). The aqueous suspensions can be true suspensions of suspended material or they can be liquors containing colloidally dispersed material. The suspended or dispersed material is usually solid.

Aqueous suspensions are usually clarified by the addition of one or more water-soluble organic polymers that are called coagulants or flocculants. These terms tend to be used rather inaccurately. In this specification, we use the term "flocculant" to denote a high molecular weight polymer that achieves its effect (i.e. flocculation) primarily by a bridging mechanism, with the result that they are sometimes referred to as bridging flocculants. We use the term "coagulant" to indicate a lower molecular weight, highly ionic, material that achieves its effect (i.e. coagulation) primarily by adsorbing onto the particles of the suspension and changing the surface charge on them, with little or no bridging effect between particles. As a result, the coagulants are sometimes referred to as charge neutralisation coagulants.

The coagulants have low molecular weight and because of this, and their high ionic content, they have low solution viscosity and dissolve easily into water. Typically, the molecular weight of coagulants is never more than around 1.5 million and it is often below 1 million, and indeed when the polymer is anionic it is usually below 0.5 million. In terms of intrinsic viscosity, IV is usually below 3 dl/g and generally below 2 dl/g.

Throughout this specification, molecular weights are the values obtained by gel permeation chromatography and intrinsic viscosities are the values obtained using a suspended level viscometer at 25° C. in 1 molar sodium chloride aqueous solution buffered to pH 7.0.

Because of the low solution viscosity of these polymers, it is possible to provide aqueous concentrates that have a satisfactory combination of viscosity and polymer concentration. For instance, poly-DADMAC is widely available as an aqueous solution concentrate. These concentrates are very easy to use since they can be dosed direct into the suspension that is to be treated or can easily be diluted in-line with dilution water to form a dilute solution that can then be dosed into the suspension.

Many methods have been described in the literature for making solid forms of water soluble polymers of various molecular weights. Solid forms do, of course, have the advantage that they do not necessitate the transport and packaging of large amounts of water and so can be more convenient, especially to the manufacturer, than aqueous concentrates. However they have not been adopted widely and solid coagulants only constitute a very small proportion of the total polymeric coagulant market. For instance although large amounts of poly-DADMAC are supplied worldwide it is supplied mainly as aqueous concentrate and grade only a small proportion of the total sales of this polymer is available in solid form, namely Percol 368 and Magnafloc 368, from Allied Colloids Inc. and Allied Colloids Limited respectively.

A solid grade coagulant must, of course, be in solution form before it can function as a coagulant and, heretofore, this has necessitated the user providing dissolution make-up equipment. The convenience and economy to the manufacturer of supplying a solid, without the need to package and transport water, has therefore tended to be outweighed by the user preferring to obtain what was considered to be equivalent performance but without the inconvenience of having to provide make-up equipment.

An entirely different situation applies to flocculant polymers since these are always much higher molecular weight and many of them tend to dissolve only very slowly into water. For instance flocculant polymers generally have molecular weights of at least 4 million and usually at least 5 million, and frequently above 10 million. Intrinsic viscosity is generally above 5 dl/g and frequently above 10 dl/g, especially with the anionic and non-ionic polymers.

Because of the high molecular weights, flocculant polymers have very high solution viscosities and so it is not possible to supply handlable concentrates having adequate polymer concentrations. Accordingly, the flocculants generally have to be supplied as powders or as dispersions in oil. The polymer then has to be dissolved into water. The rate of dissolution depends upon ionic charge and molecular weight. Some dissolution can occur with some polymers within a few minutes, but many of the polymers take at least an hour to go to full solution. Such polymers include, for instance, many of the polyacrylamides. Since the flocculant polymers cannot exert their bridging effect until they are in proper solution, it is therefore conventional for the user to install sufficient make-up apparatus to ensure that the flocculant can be truly dissolved before it is dosed into the suspension that is to be treated. Such make-up apparatus generally has to involve a storage vessel that can hold the flocculant for at least an hour while it goes into true solution.

Although this is true of normal flocculation processes, a few exceptions to this general rule have been proposed in the literature.

For instance in JP-A-48084776 and JP-A-49049802 high molecular weight flocculant is added as powder direct into a sludge that is being transported or pumped into a pit. In each instance the flocculant is partially hydrolysed polyacrylamide of molecular weight 5 million or more, and so presumably is not highly anionic (depending on the degree of hydrolysis). Also, it is known to add flocculant powder to a slurry of mine tailings that is being pumped down through a mine to form a backfill. In all these processes, the flocculant powder can be in contact with the slurry for a considerable time before it needs to complete its flocculation effect, and so there is time for the powder to dissolve. Similarly, in JP-A-60282787 a mixture of high molecular weight powdered flocculants is added to an emulsion but again the separation process appears to be sufficiently slow to permit dissolution.

The main difficulty with such methods is that high molecular weight flocculants only dissolve slowly. It has been proposed to treat the polymer particles in various ways, presumably with the intention of accelerating their rate of dissolution. Disclosures of such processes are in, for instance, JP-A-50003974, JP-A-49121309, JP-A-58070807 and JP-A-58089915 and U.S. Pat No. 4,089,831. It is also known to dissolve high molecular weight polymeric flocculant from within bags and shaped articles that are immersed for prolonged periods in a flowing suspension, for instance as described in JP-A-53091072 and JP-A-56115605, EP-A-255283 and U.S. Pat. No. 4,820,424.

All these methods tend to utilise polymer at a rather uncontrollable rate and so may suffer from underdosing or overdosing.

Quinn in U.S. Pat. No. 3,977,971 is concerned with the problems that arise when dissolved bridging flocculant is added to an aqueous suspension, such as a dredging product, that is to be pumped over a long distance before being allowed to settle at a location where it is inconvenient to make up and add a solution of bridging flocculant. In particular he avoids the consequential damage due to shear of the bridging flocculant by adding it in solid form and allowing it to dissolve during the prolonged travel (8000 feet at 18 feet per second in an example) to the settlement position.

Morgan in U.S. Pat. No. 3,968,037 and in Adv. Chem. Ser.;187; 235–252 (1980) describes flocculation processes using emulsion polymers of, especially, diallyl dimethyl ammonium chloride wherein the polymer in the emulsion particles is cross-linked or linear. She states that these particles are put into solution in water before the polymer is used as a flocculant.

Although it is normally required for a polymer to be in true solution to function effectively as coagulant or flocculant there have been some disclosures (e.g., U.S. Pat. Nos. 3,235,490 and 3,021,269) where apparently cross linked and potentially insoluble polymers were homogenised before use so as to permit them to form what appears to be a true solution of relatively low molecular weight polymer. Other disclosures of increasing the suitability of polymers by shearing are in U.S. Pat. Nos. 4,705,640 and 4,759,856.

Whereas true solubility is normally required before contact with the aqueous suspension, in U.S. Pat. No. 4,720,346 the polymer is a high molecular weight synthetic polymeric flocculant and performs its flocculating function on the suspended solids while the polymer is still in the form of polymeric particles having a size of below 10 µm. These particles can, if left long enough, be truly soluble in water but preferably the polymer is cross linked so that they cannot dissolve fully into water.

The very small particle size, of below 10 µm, is essential. Normally it is provided by introducing the polymer particles as a dispersion that has been made by reverse phase polymerisation but in EP-A-326382 it is provided by introducing the polymer in the form of friable aggregates that have been made by bonding the substantially dry polymer particles having a size of below 10 µm with an aqueous liquid and drying the aggregates, whereby the aggregates disintegrate upon addition to water to release the individual polymer particles.

In all coagulation and flocculation processes, there is always the desire to achieve better performance, leading to better clarity or reduced consumption of polymer or both, and/or to achieve simpler techniques of operation.

OBJECTS OF THE INVENTION

It is accordingly an object of the invention to provide improved processes for the separation of dispersed or suspended material from aqueous dispersions and suspensions. It is a further object to provide such processes that use polymer in the form of a powder but which avoids the need for normal solids make-up apparatus and eliminates the need for normal concentrate handling equipment such as pumps and in-line dilution equipment. It is a further object of the invention to provide improved separation of solids from the suspension when treated by the treatment polymer.

In particular, it is an object of the invention to provide an improved way of supplying and utilising ionic coagulant polymer having a sufficiently low molecular weight that it can normally be supplied as a aqueous concentrate but which, for convenience, is supplied as a powder. A further object is to obtain improved performance.

SUMMARY OF THE INVENTION

The invention provides a process of coagulating an aqueous suspension of coagulatable material by using a water-soluble, low molecular weight, coagulant which is a polymer of ethylenically unsaturated cationic monomer and dissolving this polymer into the suspension that is to be coagulated, and thereby causing coagulation of the coagulatable material in the suspension. The coagulated material is then separated from the suspension.

In particular, one preferred process comprises providing a particulate, water soluble, highly ionic, polymeric DADMAC coagulant that has intrinsic viscosity of 0.2 to 3 dl/g (and which therefore has low molecular weight) and that is in the form of solid particles that have a size of at least 90% by weight above about 30 µm, mixing the said solid particles into the suspension and thereby dissolving the particles in the suspension and coagulating the suspension, and subjecting the coagulated suspension to a separation process and thereby separating said coagulatable material from said liquor.

Another important aspect of the invention resides in the use, as the low molecular weight, highly ionic coagulant polymer, of a polymer of dimethylaminoethyl methacrylate acid addition or quaternary ammonium salt. We have surprisingly found that such a polymer, and especially a homopolymer of the dimethylaminoethyl methacrylate in particulate form can give very beneficial performance results, especially when the intrinsic viscosity is in the range 0.2 to 3 dl/g, preferably in the range 0.6 to 1.8 dl/g.

It is particularly surprising that beneficial results are obtainable from the use of beads or other particles of a substantial homopolymer of dimethylaminoethyl methacrylate acid addition or quaternary ammonium salt having IV below about 2 or 3 dl/g. Such materials have not previously been proposed in bead or other substantially dry, relatively coarse, particulate form.

In the invention, it is generally found that when the cationic coagulant is required to optimise turbidity, the best results (i.e., lowest turbidity) is obtained with the lower IV values, for instance in the range 0.2 or 0.5 to 1.5, preferably 0.5 to 1.2, but when settling rate is the desired parameter higher IV values may be appropriate, for instance in the range 0.9 to 2, preferably around 1.1 to 1.6, most preferably about 1.1 to 1.3 or 1.4 dl/g.

For convenience, we refer to the monomer dimethylaminoethyl methacrylate acid addition or quaternary ammonium salt below as DMAEMA. The acid addition salt may be, for instance, the hydrogen chloride salt and the quaternary ammonium salt may be the methyl chloride or dimethyl sulphate or other conventional quaternary salt.

The invention is of particular value when the separation process comprises the addition of an aqueous flocculant composition to the coagulated suspension and dewatering the resultant flocculated suspension.

DETAILED DESCRIPTION OF PREFERRED EMBODIMENTS

In the preferred process a low molecular weight, ionic, coagulant polymer, preferably of diallyl dimethyl ammonium chloride or DMAEMA, is added as solid particles to a suspension that is to be coagulated and dissolves rapidly in the suspension and coagulates it, and the coagulated material is separated from the suspension. Generally this separation is facilitated by adding a flocculant to the coagulated suspension, for instance by adding a conventional counterionic high molecular weight flocculant solution to the suspension.

The solid coagulant can be added while it is dry, i.e. as a powder, or as a slurry in a liquid. If the liquid is a solvent for the coagulant (for instance if the liquid is water) the slurry must be added to the suspension sufficiently quickly after the coagulant first contacts the water that a substantial amount (at least about 50% and preferably at least about 75%) of the coagulant is still in solid form when the slurry contacts the suspension.

We have surprisingly found that the addition of solid, low molecular weight, ionic DADMAC or DMAEMA coagulant to the suspension generally gives a significant, and often very highly significant, improvement in coagulation performance relative to when the same amount of the same DADMAC or DMAEMA polymer is added to the suspension as a solution in conventional manner. As a result it is possible to use less polymer to obtain equivalent performance.

Another advantage is that when the coagulated suspension is to be flocculated by subsequent addition of high molecular weight flocculant, the amount of flocculant that is required tends to be reduced.

The invention has the further advantage that it eliminates the need for equipment for handling aqueous concentrates (e.g., pumps and in-line dilution equipment) and it avoids the equipment traditionally associated with solid grade polymers, namely the make-up equipment that is traditionally installed to allow the solid grade polymer to be put into the form of a solution prior to dosage into the suspension.

We are unclear as to why it is possible, by this technique, to obtain better results than are obtainable using a preformed solution of the same DADMAC or DMAEMA polymer, but it may be associated in some way with the polymer being released continuously over a useful period into the suspension. Thus it seems that as DADMAC or DMAEMA polymer molecules dissolve from the solid DADMAC or DMAEMA polymer particles, these molecules are absorbed substantially immediately on to the coagulatable material to form the desired ionic surface characteristics on the particles of coagulatable material. If agitation or other effects cause a deficiency of polymer (and therefore of ionic charge) on part of the surfaces of suspension particles, this deficiency is probably made up by fresh polymer that is still dissolving from the polymer particles. This is in contrast to conventional processes where all the polymer is made available instantaneously as a solution. Once that polymer has been adsorbed onto the particles there will probably be a much lower tendency for fresh polymer to be available to adsorb onto any surfaces where there is a deficiency of polymer, for instance as a result of breakdown of the coagulated particles.

However, irrespective of the reason or the mechanism, the process definitely has the advantage that it is possible to obtain greatly improved performance at the same time as using a solid material by a simplified process and apparatus and without a make-up or dilution stage.

The term "coagulatable material" is used herein to embrace both materials that are already present as suspended solids and materials that are present as a colloidal dispersion. Thus it embraces particulate solids such as pigment, clay, coal and sewage solids, and it also embraces colloidally dispersed materials such as colouring matter in water and humates. The process of the invention can bring more of this colloidally dispersed material out of colloidal solution as a particulate solid than when the same polymer is added as a solution.

Flocculation processes involving bridging flocculants can be relatively slow and indeed bridging may occur during, for instance, sedimentation after addition of a flocculant. However coagulation processes depend primarily upon charge effects and coagulation processes therefore tend to be very fast. For instance, coagulation often precedes the addition of a bridging flocculant, and this is generally added very soon after the coagulant.

In the invention, the particles of DADMAC polymeric coagulant dissolve upon contact with the suspension, because the coagulant is water soluble. Accordingly coagulant DADMAC or DMAEMA polymer molecules are made available for coagulation immediately upon addition to the suspension, and further molecules are made available as the coagulant continues to dissolve. It is preferred that the polymer particles undergo substantial dissolution and preferably go into substantially complete solution in less than about five minutes and preferably much quicker, generally within about one minute and preferably within about thirty seconds of being added to the suspension.

Whether or not a polymer particle has dissolved can be determined by filtration in that a screen that retains a dry or gelled polymer particle will not retain a solution of the polymer particle. A convenient way of testing the solubility therefore is to select a screen that retains a known proportion, for instance substantially all, of the polymer particles when dry and then to filter the aqueous suspension into which the polymer particles have been mixed and observe the proportion of polymer particles retained on the screen. The retained proportion at the end of the mixing period (i.e., when they should be substantially fully dissolved) must be very much less than the retained proportion of dry polymer particles, for instance having a dry weight below a quarter and preferably below one tenth of the weight of the retained dry particles.

Generally the DADMAC or DMAEMA polymer particles are substantially individual particles but if they are aggregates that break down into smaller particles before dissolution (for instance as in EP 326382) then the size of screen that should be used for testing whether or not dissolution has occurred should be the size that retains the individual component particles within each aggregate.

The optimum duration for dissolution will depend upon the particular suspension that is being coagulated and the particular form of DADMAC or DMAEMA polymer that is being used. If the rate of dissolution is too slow, some of the polymer may remain undissolved during the period when a coagulation effect is required, for instance during passage in a flow line to a flocculation stage, and so may involve the use of more polymer than would be required if it dissolved faster. Preferably the polymer is substantially fully dissolved before the suspension reaches the next treatment stage, and in particular before it reaches the next point of addition of treatment chemical, for instance bridging flocculant.

The polymer particles can be added in dry form, i.e. as a powder, for instance by being metered direct from a hopper or other dry store into the suspension. Generally the particles are metered into the suspension as it flows along a duct. The metering can be by, for instance, a screw feeder.

It is necessary for the metering device to be positioned quite close to the suspension, for instance so as to minimise the risk of beads being blown away from their suspension, and this means that the screw feeder or other metering device is liable to become moist, for instance due to humidity close to the suspension and due to the risk of splashing by the suspension. Also, it can occasionally be difficult to find a position on the plant where it is convenient for the screw feeder and associated hopper to be positioned close to the flowing duct or other vessel that contains the suspension.

In order to overcome these difficulties, it can be convenient to add the particles as a slurry in a liquid. For instance the screw feeder can discharge the particles onto a funnel or other baffle surface that protects the screw feeder from the humidity and spray of the suspension and water can be flowed over the surface of the funnel or baffle so as to wash the particles down into the suspension. The point at which the water contacts the particles can be close to the suspension or can be removed some distance away from it, especially if sufficient water is added to provide a slurry that can easily be flowed through a pipe leading from the screw feeder to the dosage point.

In another system, the particles may be fed by screw feeder or other metering device into a funnel or other inlet that leads into a water venturi, by which the particles can be sucked into a slurrying stream of water. Wash water may be applied to the funnel to prevent particles sticking to it. The stream of water and particles is then fed to the suspension, for instance, in a closed reactor vessel or pipeline.

In all instances where the DADMAC or DMAEMA polymer is contacted with water before it is added to the suspension, it is of course necessary that the aqueous slurry should be added to the suspension before there has been substantial dissolution of the polymer into the aqueous slurry. Thus generally it is preferred that at least 50% and preferably at least 75% by weight of the polymer is still in particulate form at the time the polymer is added to the suspension, in order that a useful amount of the polymer dissolves while in the suspension.

Instead of forming a slurry in water or other solvent for the polymer, the slurry can alternatively be formed in a non-solvent for the polymer. Typical non-aqueous liquids that can be used for this purpose are paraffinic and other hydrocarbon oils, typically of the same type as are conventionally used in reverse phase polymerisation processes. Although the slurry in non-solvent can be formed at the point of application, it is also possible to provide the polymer to the user in the form of a substantially stable dispersion of the polymer particles in the non-aqueous liquid. In order to promote stability it is generally preferred for the particles in the non-solvent slurries to be relatively small, mainly below 100 μm. For instance the particles can be fines separated by sieving from coarser polymer particles. The dispersion in the non-solvent can be stabilised by the presence of an amphipathic polymeric stabiliser.

It is conventional to include an oil-in-water emulsifier when dispersing conventional reverse phase emulsions into water. However, in order to promote the dissolution of the polymer particles into water, in the invention it is generally unnecessary to include such an emulsifier when, as is preferred, the non-aqueous slurry is metered direct into a flowing stream of the suspension, since the flowing stream will provide enough agitation to cause emulsification of the oil into the suspension and the consequential release of the polymer particles from the oil, so that they can then dissolve into the suspension.

Although the DADMAC or DMAEMA polymer particles (or the component particles within aggregates that disintegrate into particles in the suspension) can have a size as small as 30 μm or even about 20 μm, when the polymer is being added as a powder or as a slurry in water it is generally preferred for substantially all (e.g. above 90% by weight) to be above 70 μm and for the average size to be at least 100 μm and generally at least 200 μm. If the polymer particles have an average size that is too large then this can be undesirable, for instance because it can increase the time taken to achieve dissolution. Thus although it can be above 1 mm, preferably it is below 1 mm and usually below 800 μm. It is generally preferred for the polymer particles to have a size of at least 90% by weight in the range 100 μm to 1,000 μm, often in the range 200 μm to 800 μm. Although it is normally preferred for polymers to have a reasonably narrow range of particle sizes, in the invention it can be advantageous to have a relatively wide spread of particle sizes so as to spread the time over which polymer dissolves.

When the particles are added as a slurry in a non-aqueous liquid, smaller particle sizes can be suitable, especially if the slurry is required to be stable during storage and transport. For instance the particle size can be at least 30%, preferably, at least 50%, by weight between 30 and 100 μm, preferably 30 to 70 μm, with at least 90% by weight between 30 and 600 μm, preferably between 30 and 200 μm.

The DADMAC or DMAEMA polymers with which this invention is concerned are low molecular weight, charge neutralising, polymers and can be substantially the same as the materials that have, heretofore, usually been supplied as aqueous solutions because of their low solution viscosities. Therefore the particles will inevitably tend to start dissolving very quickly, and may be substantially fully dissolved within about a minute, often within about half a minute. These low solution viscosity and high dissolution rates are associated with the charge density and the molecular weight (intrinsic viscosity) of the polymer. If the molecular weight is too high then the polymer will not be an ionic charge neutralising coagulant but will instead tend to be a bridging flocculant and, in any event, will have a solution viscosity such that it is not commercially convenient to supply it as an aqueous concentrate. The optimum intrinsic viscosity depends upon the ionic charge and the particular polymer. The intrinsic viscosity is generally in the range 0.2 to 2 dl/g, preferably in the range of about 0.5 to 3, most preferably around 0.8 to 2.4 dl/g. Expressed in terms of molecular weight, it is generally preferred for the molecular weight to be below about 1 million, preferably below about 700,000 (measured by gel permeation chromatography) although it should generally be above 100,000.

Although any particulate form of water soluble coagulant, charge-neutralising, polymer formed from monomer comprising diallyl dialkyl ammonium salt or DMAEMA can be used, the preferred polymers for use in invention are polymers having a cationic content of at least 80% by weight DADMAC and/or DMAEMA. Monomer blends comprising DADMAC or DMAEMA and other cationic ethylenically unsaturated monomer can be used, for instance dimethyl amino propyl methacrylamide salt. Preferred polymers are homopolymers of DADMAC or DMAEMA and copolymers of either optionally with a minor amount of a substantially non-ionic ethylenically unsaturated monomer, generally acrylamide. Thus the invention is generally performed using either a homopolymer of DADMAC or DMAEMA, or a copolymer with acrylamide generally in an amount of not more than about 5% but optionally in amounts of up to 20% by weight, or sometimes higher. Thus it is preferred for the polymers to contain 0–5% (often 0%) acrylamide or other non-ionic monomer and 95 to 100% by weight of the cationic monomer or monomers. The combination of low IV or molecular weight and high cationic charge is critical to the invention. Bridging flocculants having lower cationic charge density and high molecular weight, such as those identified by Quinn in U.S. Pat. No. 3,977,971 (e.g., the 50% acrylamide 50% cationic bridging flocculant) will not give similar effect.

The polymer is generally a substantially linear polymer (for instance having been made without the deliberate addition of cross-linking agent) but if desired small amounts of cross-linking agent may be included to induce some chain branching and thus an increase in molecular weight.

The particles of polymer are preferably substantially bead shaped, for instance as made by reverse phase suspension polymerisation. Reverse phase suspension polymerisation typically comprises dispersing beads of aqueous monomer in a water immiscible liquid, generally in the presence of amphiphilic polymeric stabiliser, polymerisation within the beads, drying by azeotropic distillation and then separation of the beads from the liquid, often followed by further drying. Suitable methods and materials are well known and are described in, for instance, U.S. Pat. Nos. 2,982,749, 4,506,062 and 4,528,321.

Other solid particulate forms can be used. For instance a solution of the polymer can be drum dried or otherwise dried as a film which can then be converted into flakes. If the polymer itself has characteristics such that it is difficult to provide it in the form of solid particles that can be handled without, for instance, caking, then the particles can be formed of a mixture of a carrier (that promotes formation of particles) and the polymer. For instance the polymer can be distributed throughout beads of a matrix material that will liberate the polymer rapidly upon contact with water, for instance as a result of disintegration of the matrix in water. A suitable matrix material is a carbohydrate, for instance starch, or an inorganic carrier material. The blend can be made as in, for instance, EP-A-188489. Preferably however the polymer particles consist solely of the desired polymer.

Suitable polymers are available in bead form from Allied Colloids Inc. and Allied Colloids Limited under the trade names Magnafloc 368, Percol 368 (cationic polydiallyldimethyl ammonium chloride) and Percol 370 (95% DADMAC 5% acrylamide polymer).

The mixing of the particulate polymeric coagulant into the suspension is normally accompanied by some degree of agitation of the suspension, although with highly soluble particles adequate mixing may be achieved merely by adding the particles to the suspension. Generally however some degree of turbulence should be applied to the suspension to promote dissolution of the particles. The turbulence that inevitably arises during flow of a stream that is being coagulated in conventional manner can be sufficient and excessive shear (eg as provided in a homogeniser) is undesirable. Accordingly the preferred mixing consists essentially of the flow along duct means leading to the separation stage, although some initial mixing may be applied to promote uniform distribution of the polymer particles as they are scattered, flowed or injected into the flowing suspension.

The process may be carried out batchwise, but generally the particles are added to a flowing stream of the suspension and the suspension is caused to flow turbulently along duct means from the position at which the particles are added to the position at which the separation process is initiated. For instance this flow can be along a simple duct (optionally as a launder provided with baffles to create extra turbulence) or it can be along a series of ducts, for instance including some substantially downwardly extending ducts so as to promote extra turbulence.

In conventional coagulation and flocculation processes, the respective polymers are added as fully dissolved aqueous solutions and it is well known that it is then undesirable to continue applying shear (i.e., to continue turbulence) for too long since this tends to result in resuspension of the originally suspended particles and reduction in performance. However in the invention excess shear is not so undesirable, and indeed can be positively advantageous, since fresh polymer molecules can continuously be dissolved from the polymer particles and so even if the distribution of polymer on the particles of the original suspension is damaged fresh polymer molecules are available to recoagulate the surfaces of the suspension particles. Nevertheless, it is generally desirable that the entire coagulation process, and in particular the mixing or application of shear that occurs during the process, should be relatively short and preferably mixing does not continue for significant periods after the polymer has dissolved.

In preferred processes, the total time that elapses between initially adding the polymer particles and introducing the coagulated suspension to the separation process apparatus (e.g., a sedimentation vessel) is not more than about five minutes and preferably not more than about one minute. Generally it is at least 5 or 10 seconds.

As is known, there are some instances where a coagulant polymer by itself (conventionally added as a solution) will give adequate coagulation and separation, without any subsequent chemical treatment. Accordingly, this is also possible in the invention.

However, it is more normal to follow the addition of a coagulant solution with the addition of a flocculant solution, and in the invention it is usually preferred to incorporate a polymeric flocculant into the suspension after the coagulant polymer has dissolved and coagulated the suspension. The flocculant causes flocculation of the coagulated solids, and in particular can cause the formation of flocs that are larger than the aggregates obtained by use of the coagulant alone. The incorporation of the flocculant may be by conventional means, such as the addition of aqueous flocculant followed by brief (e.g., up to 15 seconds and often less than 5 seconds) agitation to achieve thorough mixing prior to sedimentation or other dewatering.

The preferred process of the invention comprises adding the solid coagulant polymer to a flowing stream of the suspension at a coagulant addition point, adding aqueous flocculant to the flowing stream at a subsequent flocculant addition point that is separated from the coagulant addition point by a flow time of about 10 seconds to about 5 or 10 minutes, preferably not more than about 1 minute, and feeding the suspension to a sedimenting tank or other dewatering step at or substantially immediately after the flocculant addition point.

When flocculant is used, it is usually counterionic to the coagulant polymer that is added in particulate form. The coagulant polymer is cationic, and so the flocculant is preferably anionic. A surprising advantage of the invention is that the amount of flocculant that is required to achieve any particular level of clarification is generally less, when the coagulant polymer is added in particulate form, than when the coagulant polymer is added as a solution. For instance the amount of counterionic flocculant may be one fifth to three quarters, typically around half, of the amount normally required.

The flocculant may be any of the conventional bridging flocculants, and thus should have a sufficiently high molecular weight to give a bridging, as opposed to a coagulating, mechanism. Typically therefore the molecular weight is at least 5,000,000 and/or intrinsic viscosity is preferably at least 6 dl/g. The polymeric flocculant can be a natural or modified natural polymer but is generally a synthetic polymer formed from the monomers listed above. Since the coagulant is cationic, the flocculant is preferably anionic, often sodium polyacrylate or a copolymer with acrylamide. The amount of flocculant can be selected by routine optimisation and is usually less than the amount that would be optimum when the coagulant is added as a solution. It is usually in the range 0.1 to 50 mg/l of suspension.

When the suspended material is solid (i.e., suspended or colloidally dispersed solids), the separation process preferably comprises a sedimentation process. It can consist solely of sedimentation but generally it involves a further dewatering step. Any such further dewatering step is generally conducted on the sediment obtained by the sedimentation. Such further processes include centrifugation and filtration, e.g., on a filter press or belt press.

One particularly preferred process of the invention involves applying the process to tailings from a coal washer or from an iron ore concentrator. Thus coal or iron ore is washed and the desired product (coal or iron ore) is separated by sedimentation or other appropriate separation technique to leave a liquor, termed tailings, that is a suspension of the waste products. These waste products often comprise clay. Most of the solids may be suspended solids but some can be colloidally dispersed, as colourants. Conventional processes involve adding a solution of coagulant polymer to the tailings as they flow along a duct towards a sedimentation tank, with flocculant solution generally being added immediately before the sedimentation tank. The liquor resulting from the sedimentation generally still contains some suspended solids and can be coloured.

By the invention, it is possible to obtain much better separation of solids, and in particular to remove not only substantially all the suspended solids but also most of the colourant. Thus the process of the invention can result in a very clear, less coloured, liquor than is obtainable by conventional techniques, and yet avoids the need for a make-up unit or for the pumps or in-line dilution apparatus normally associated with the use of aqueous concentrates.

The preferred polymer for use in this technique is a homopolymer of diallyl dimethyl ammonium chloride or DMAEMA (or a copolymer with up to 20% acrylamide) having intrinsic viscosity 0.5 to 3 (preferably 0.8 to 2.5) dl/g. The polymer is preferably added in the form of dry beads which typically mainly have a size in the range 200 to 1000 μm. Alternatively it may be added as a slurry in water formed a few seconds before addition, or a slurry in a non aqueous liquid (in which event finer particles down to 30 μm may be suitable).

A solution of flocculant (e.g., sodium polyacrylate molecular weight above 5 million) can be added to the coagulated suspension generally after all the coagulant has dissolved and immediately prior to the sedimentation tank or other dewatering process. The total time between adding the particles and introducing the suspension into the sedimentation tank is generally less than five minutes, preferably less than about one minute and most preferably is less than about thirty seconds.

Although the process is of particular value when applied to suspensions that are mineral washery tailings, such as iron ore and coal washery tailings, it has surprisingly been found that it is also of value on a range of other industrial waste waters and other suspensions.

One important aspect of the invention arises when the aqueous suspension is a china clay effluent, for instance in the winning of such clays.

Another important aspect of the invention is in the treatment of waste water from the feldspar and alumina industries. In particular, red mud washery liquors contaminated with colloidal humate can be decolourised by the addition of the chosen polymer in particulate form, instead of adding it in the conventional solution form as proposed in U.S. Pat. No. 4,578,255.

In addition to being of use in the treatment of mineral suspensions, the invention is also of value in the treatment of organic suspensions and in the production of potable water. Less preferably, it can b used in cracking of oil-in-water emulsions.

Another important aspect of the invention is when the suspension is a cellulosic suspension, for instance a white water effluent from a paper mill or some other suspension associated with paper production and that needs to have solids removed and to be decolourised, for instance by the removal of fibres, resinous materials and lignins.

Another important aspect of the invention includes the treatment of suspensions comprising sewage solids, for instance sewage sludge.

Another important aspect of the invention involves the removal of colouring matter and optionally suspended solids from potable water, typically prior to sedimentation or filtration through a sand bed.

Another important type of suspension is a coloured effluent from the textile industry, where the process is designed to decolourise the effluent.

In a further aspect of the invention, the coagulatable material is, at all relevant times, a liquid and thus is not suspended solids nor colloidally dispersed solids. Thus the particulate coagulant may be added to an oil-in-water emulsion as a coagulant for cracking the emulsion.

The solids content of the suspension is generally below 10%, typically 0.02% to 8%, but another important aspect of the invention involves applying the process to suspensions having a higher solids content, typically 10 to 30%, for instance suspensions obtained by sedimentation in a previous separation process. Thus another process comprises dewatering a suspension (often after the addition of particulate coagulant as proposed in the invention) and then adding particulate polymer to the dewatered product and subjecting it to further dewatering after the polymer has dissolved, in accordance with the invention.

The optimum dosage of particulate DADMAC or DMAEA or other coagulant polymer can be selected by routine experiments and is generally within or below conventional amounts of dissolved coagulant polymer. For instance it is often 0.1 to 20, frequently 0.5 to 5 mg/l suspension.

Some of the benefits obtainable by the invention defined herein can also be achieved when using the other coagulant polymers described in our application Ser. No. 989650 filed 14 Dec. 1992 the entire disclosure of which is hereby incorporated by reference. In particular, it is desirable to add these other coagulant polymers as a slurry in a liquid, either an aqueous or a non-aqueous liquid in the same manner as is described above. They can have the same particle sizes as described above for the preferred poly DADMAC or poly DMAEA particle suspensions.

The following are examples of the invention.

EXAMPLE 1

A homopolymer is formed from diallyl dimethyl ammonium chloride by reverse phase bead polymerisation by the general technique shown in U.S. Pat. No. 4,506,062. The beads have a particle size of 90% by weight between 200 and 800 μm and they have intrinsic viscosity of 1.4 dl/g. Suitable beads are available from Allied Colloids Inc. under the trade name Percol 368.

Coal washings are subjected to froth flotation and the tailings from the flotation cells drop around 30 meters from the cells down a duct to the ground and to a pump by which they are pumped about 100 meters vertically upwards to a feed launder leading to a feed well at the inlet to a sedimentation (or thickener) tank. A solution of anionic polymeric flocculant (copolymer of 60% acrylamide 40% sodium acrylate, IV about 16 dl/g) is added at the feed well, so as to promote settling in the tank.

The tailings have pH 7.4, around 7% solids material of which around 75% is below 100 mesh and is mainly clay.

In one process the cationic polymer beads are screw fed into the tailings from the flotation cells as they leave the cells.

In another process an aqueous solution of a similar polymer is added into the feed launder to the sedimentation tank.

It is found that addition of about 80 g/m$^3$ (dry weight) of the solution polymer gives clarified water containing 80 to 90 NTU, whereas dosage of only 36 g/m$^3$ of the polymer beads gives clarified water of 60 to 70 NTU and the filtration of the sediment is performed more easily.

EXAMPLE 2

The polymer of example 1 is fed into a stream of coal tailings discharging from a primary settling pond to a secondary settling pond. Flow is by gravity down a pipe with a passage time of less than thirty seconds. The suspended solids of the overflow from the secondary settling pond is determined. With polymer dosages ranging from 0.0025 to 0.0125 g/l, the suspended solids range from around 0.18% to 0.16% respectively.

When the same polymer is added as a 1% solution at polymer dosages of 0.0125 to 0.024 g/l, the suspended solids range from 0.3% to 0.25% respectively. This again demonstrates the dramatic reduction in suspended solids obtainable by the use of the solid form of polymer in contrast to the solution form.

EXAMPLE 3

In this example, the polymer is similar to example 1 except that it has higher molecular weight, intrinsic viscosity about 2 dl/g.

12.5 liters of an 8% aqueous dispersion that is an iron ore tailings is agitated in a large bucket and 0.0027 grams polymer is added, with agitation continuing for 15, 30 and 60 seconds. Samples are taken after each period of agitation and the settling rate in inches (2.54 cm) per minute is recorded. The highest value is desirable. A clarity wedge value is recorded after 10 minute settling, and again the highest result is desirable. The results are shown in the following table.

|  | Dry Polymer | | Solution Polymer | |
| Mixing time | Settling Rate | Clarity Wedge | Settling Rate | Clarity Wedge |
| --- | --- | --- | --- | --- |
| 15 seconds | 1.0 | 21 | 0.9 | 14 |
| 30 seconds | 1.0 | 19 | 0.88 | 13 |
| 60 seconds | 0.95 | 16 | 0.85 | 13 |

These results clearly demonstrate that the best results are obtained with the dry polymer, and that the results are better at 15 seconds mixing than at 60 seconds mixing.

EXAMPLE 4

A slurry of 1% kaolin in water containing 1 g/l sodium chloride is prepared. 1 liter of the slurry is placed in a cylinder provided with a perforated steel plunger, depression of which causes mixing of the slurry. The test polymer is added, at dosages ranging from 1 to 5 mg/l and the slurry is subjected to 3, 6 or 9 plunges of the plunger.

The process is repeated using polymers of diallyl dimethyl ammonium chloride having, respectively, intrinsic viscosity 0.4, 0.9 and 2.0 dl/g. The settlement rate and clarity is recorded.

In every instance, the settlement rate is better, at a given number of plunges, for the solid polymer than the solution polymer and decreases with an increase in the number of plunges. In every instance the settlement rate of the polymer having IV 2 is better than the settlement rate for the polymer having IV 0.9 which, in turn, is better than the settlement rate for the polymer having IV 0.4 dl/g.

Similarly, the compaction deteriorates (increases) with an increase in the number of plunges and with decreasing IV. In general, the compaction is always better with the solid polymer than with the corresponding solution polymer.

As regards clarity, there is little difference between the results obtained with the solid and solution polymers having IV 0.4 but the solid form of the other two polymers is always better than the solution form, with best results being obtained with the polymer having IV 2 and about 6 plunges.

The settlement rate and clarity each tend to improve as the dosage increases from 1 to 5 mg/l, except that with the polymer of IV 0.9 dl/g the best settlement rate is achieved at a dosage of about 2.5 mg/l.

EXAMPLE 5

A slurry is prepared of 1% china clay, 150 mg/l sodium humate and 200 g/l sodium hydroxide. 500 ml samples of this slurry are stirred at 150 rpm and dosed with various amounts of polymeric coagulant, either as solid or as aqueous solution. Stirring is continued for 11 minutes and 2 mg/l sodium polyacrylate (molecular weight above 5 million) is added and stirred in for the last minute.

A sample of supernatant is removed and the humate concentration in parts per million calculated from its UV absorbents. At 30 and 90 mg/l polydiallyl dimethyl ammonium chloride (IV 0.9 dl/g) the humate concentrations are substantially the same both when introduced as solid and as liquid, but at 60 mg/l dosage the humate concentration is much lower (better) using the solid than the solution polymer (36 ppm compared to 44 ppm).

EXAMPLE 6

The process of Example 1 may be repeated except that the poly DADMAC polymer beads are screw fed into a funnel that discharges into the tailings and that is continuously washed with a stream of water in order that the particles are washed from the funnel as slurry that contacts the tailings within a few seconds of the intitial contact between the beads and the water.

EXAMPLE 7

The beads described in Example 1 may be obtained by sieving the product of a reverse phase polymerisation to give a fines fraction of which at least 30% by weight is between 30 and 100 μm and which is mainly below 200 μm. These fines may be dispersed in a paraffinic oil containing an amphipathic polymeric stabiliser of a conventional type for use in reverse phase polymerisation to form a slurry containing the fines.

The process of Example 1 may be repeated by metering this slurry into the tailings.

EXAMPLE 8

A homopolymer is formed of dimethylaminoethyl methacrylate quaternised with methyl chloride by the same general polymerisation technique as is used for the DADMAC hompolymer in Example 1. The beads have a particle size of 90% by weight between 200 and 800 μm. The intrinsic viscosity can be selected in the method by known means, such as adjustment of the amount of initiator and the temperature of the reaction.

By this technique, a range of polymers B, C, D, E and F were obtained.

These polymers had intrinsic viscosity values of, respectively, 0.78, 0.96, 1.20, 1.37 and 1.57 dl/g.

They were used in a test broadly as described in Example 1 for determining the settlement rate and the turbidity (in NTU) of coal flotation tailings, in comparison with product A, which was a homopolymer of poly DADMAC having intrinsic viscosity 0.88 dl/g.

The settlement rate and the supernatant turbidity values in NTU are shown in the following table.

| Product IV | A 0.88 | B 0.78 | C 0.96 | D 1.20 | E 1.37 | F 1.57 |
| --- | --- | --- | --- | --- | --- | --- |
| Settlement Dose (ppm) | | | | | | |
| 1 | 7.9 | 3.6 | 3.9 | 5.9 | 7.0 | 6.3 |
| 2 | 9.4 | 5.3 | 5.3 | 6.5 | 7.7 | 8.6 |
| 3 | 10.0 | 5.6 | 5.1 | 6.6 | 9.1 | 9.8 |
| 4 | 10.8 | 5.3 | 8.3 | 7.1 | 8.3 | 9.4 |
| 5 | 10.0 | 5.9 | 9.1 | 9.0 | 9.9 | 10.4 |
| 6 | 11.5 | 7.8 | 7.6 | 9.9 | 10.4 | 6.0 |
| Turbidity Dose (ppm) | | | | | | |
| 1 | 50 | 44 | 240 | 260 | 244 | 400 |
| 2 | 28 | 18 | 98 | 44 | 29 | 180 |
| 3 | 18 | 22 | 22 | 38 | 34 | 32 |
| 4 | 14 | 18 | 20 | 14 | 18 | 10 |
| 5 | 14 | 10 | 13 | 14 | 12 | 14 |
| 6 | 14 | 12 | 8 | 12 | 14 | 10 |

We claim:

1. A process of separating coagulatable suspended solids from an aqueous mineral suspension, the process comprising the steps of:

metering into the suspension a pre-selected coagulant dosage of from 0.1 to 20 mg/l of suspension of a water soluble cationic coagulant polymer that has intrinsic viscosity (IV) 0.2 to 3 dl/g and that is a polymer of 80 to 100% by weight ethylenically unsaturated cationic monomer selected from diallyl dimethyl ammonium chloride and dimethylaminoethyl methacrylate acid addition or quaternary salt and 0 to 20% other ethylenically unsaturated monomer and that is in the form of particles having a size of about 30 μm to 1 mm;

dissolving the polymer particles in the suspension and thereby coagulating the suspension; and subjecting the coagulated suspension to a separation process comprising sedimentation, thereby separating the coagulated suspended solids from the suspension.

2. A process according to claim 1 in which the polymer is formed from 80 to 100% of the said cationic monomer and 0 to 20% by weight acrylamide and has intrinsic viscosity 0.2 to 2.4 dl/g.

3. A process according to claim 2 in which the polymer is metered into the suspension while in the form of a powder.

4. A process according to claim 2 in which the cationic polymer is metered into the suspension while in the form of a slurry of the cationic polymer particles in a liquid selected from water and non aqueous liquids.

5. A process according to claim 2 in which the cationic polymer is metered into the suspension while in the form of a slurry in a non aqueous liquid of the cationic polymer in the form of particles of which at least 30% by weight have a size of from about 30 to about 100 μm.

6. A process according to claim 2 in which the coagulated suspension is subjected to said separation process within five minutes of adding the polymer particles to the suspension and said particles are substantially fully dissolved in the suspension before subjecting the suspension to said separation process.

7. A process according to claim 2 in which the coagulated suspension is subjected to said separation process within about one minute of adding the polymer particles to the suspension and said particles are substantially fully dissolved in the suspension before subjecting the suspension to said separation process.

8. A process according to claim 2 in which the coagulant polymer is added to the suspension while the suspension is flowing as a stream.

9. A process according to claim 2 in which the said separation process comprises adding to the coagulated suspension a solution of an anionic polymeric flocculant having intrinsic viscosity of at least 6 dl/g.

10. A process according to claim 2 in which the mineral suspension is selected from the group consisting of mineral washery tailings, china clay effluent, and red mud washery liquors.

11. A process according to claim 2 in which the mineral suspension is iron ore washery tailings.

12. A process according to claim 1 in which the polymer is formed from 95 to 100% by weight of the said cationic monomer and 0 to 5% by weight acrylamide.

13. A process according to claim 1 in which the polymer has intrinsic viscosity of 0.2 to about 2 dl/g.

14. A process according to claim 1 in which the cationic polymer is a homopolymer of diallyldimethyl ammonium chloride.

15. A process according to claim 1 in which the cationic polymer is a homopolymer of dimethylaminoethyl methacrylate acid addition or quaternary ammonium salt.

16. A process of separating suspended solids from an aqueous mineral suspension of the suspended solids, the process comprising the steps of:

adding to the suspension a pre-selected coagulant dosage of from 0.1 to 20 mg/l of suspension of a water soluble cationic coagulant polymer that has intrinsic viscosity (IV) 0.2 to 3 dl/g and that is a polymer of 80 to 100% selected from dimethylaminoethyl methacrylate acid addition or quaternary ammonium salt and diallyl dimethyl ammonium chloride and 0 to 20% by weight acrylamide and that is in the form of water soluble particles having a size of about 30 μm to 1 mm and thereby dissolving the particles and coagulating the suspension;

flocculating the coagulated suspension by adding an aqueous solution of anionic polymeric flocculant which has IV at least 6 dl/g to the coagulated suspension; and separating the coagulated and flocculated material from the suspension by a process comprising sedimentation.

17. A process according to claim 16 in which the cationic polymer is metered into the suspension while in the form of a powder.

18. A process according to claim 16 in which the cationic polymer is metered into the suspension while in the form of a slurry of the cationic polymer particles in a liquid selected from water and non aqueous liquids.

19. A process according to claim 16 in which the cationic polymer is metered into the suspension while in the form of a slurry in a non aqueous liquid of the cationic polymer in the form of particles of which at least 30% by weight have a size of from about 30 to about 100 μm.

20. A process according to claim 16 in which said anionic polymeric flocculant is added within five minutes of adding said coagulant polymer and the particles of coagulant polymer are substantially fully dissolved into said suspension before adding said flocculant polymer.

21. A process according to claim 16 in which said anionic polymeric flocculant is added within one minute of adding said coagulant polymer and the particles of coagulant polymer are substantially fully dissolved into said suspension before adding said flocculant polymer.

22. A process according to claim 16 in which the coagulant polymer is added to the suspension while the suspension is flowing as a stream.

23. A process according to claim 16 in which the cationic polymer is a homopolymer of diallyldimethyl ammonium chloride.

24. A process according to claim 16 in which the cationic polymer is a homopolymer of dimethylaminoethyl methacrylate acid addition or quaternary ammonium salt.

25. A process according to claim 16 in which the said cationic polymer has an intrinsic viscosity 0.2 to about 2 dl/g.

26. A process according to claim 16 in which the mineral suspension is selected from the group consisting of mineral washery tailings, china clay effluent, and red mud washery liquors.

27. A process according to claim 16 in which the mineral suspension is iron ore washery tailings.

* * * * *